US012697786B2

(12) United States Patent
Vaccari

(10) Patent No.: US 12,697,786 B2
(45) Date of Patent: Aug. 4, 2026

(54) MACHINE FOR THE WELDING OF PLASTIC PROFILED ELEMENTS

(71) Applicant: Graf Synergy S.r.l., Nonantola (IT)

(72) Inventor: Andrea Vaccari, Nonantola (IT)

(73) Assignee: Graf Synergy S.r.l., Nonantola (IT)

( * ) Notice: Subject to any disclaimer, the term of this patent is extended or adjusted under 35 U.S.C. 154(b) by 346 days.

(21) Appl. No.: 18/559,359

(22) PCT Filed: May 2, 2022

(86) PCT No.: PCT/IB2022/054030
§ 371 (c)(1),
(2) Date: Nov. 7, 2023

(87) PCT Pub. No.: WO2022/234427
PCT Pub. Date: Nov. 10, 2022

(65) Prior Publication Data
US 2024/0239054 A1 Jul. 18, 2024

(30) Foreign Application Priority Data
May 7, 2021 (IT) ........................ 102021000011810

(51) Int. Cl.
*B29C 65/00* (2006.01)
*B29C 65/20* (2006.01)
(Continued)

(52) U.S. Cl.
CPC .... *B29C 66/02241* (2013.01); *B29C 65/2061* (2013.01); *B29C 65/749* (2013.01);
(Continued)

(58) Field of Classification Search
CPC .......... B29C 66/02241; B29C 65/2061; B29C 65/749; B29C 65/7841; B29C 66/1162;
(Continued)

(56) References Cited

U.S. PATENT DOCUMENTS

| 5,666,773 A | 9/1997 | Librande et al. |
| 9,993,969 B2 | 6/2018 | Vaccari |
| 2017/0203500 A1* | 7/2017 | Vaccari ............. B29C 66/81431 |

FOREIGN PATENT DOCUMENTS

| EP | 2397642 | 12/2011 |
| EP | 3674065 | 7/2020 |
| WO | WO 2016/064357 | 4/2016 |

OTHER PUBLICATIONS

International Search Report and the Written Opinion Dated Aug. 1, 2022 From the International Searching Authority Re. Application No. PCT/IB2022/054030. (9 Pages).

* cited by examiner

*Primary Examiner* — Christopher W Raimund

(57) ABSTRACT

A machine (1) for the welding of plastic profiled elements comprises retaining means (3, 4) for retaining a first profiled element (5) and a second profiled element (6). Each profiled element has an area to be welded (7) inclined between 10° and 80° relative to its longitudinal direction and a square-shaped main face (5a, 6a). The main face (5a) of the first profiled element (5) projects from its area to be welded, while the main face (6a) of the second profiled element (6) is recessed. Removal means (16) comprising milling tools (17) remove plastic material from the areas to be welded. Suction means (20) include a suction duct (21) arranged around a milling tool and elongated along its axis of rotation, having a substantially flat abutment portion (24) adapted to internally abut against the projecting main face (5a) during material removal.

10 Claims, 10 Drawing Sheets

(51) Int. Cl.

| | |
|---|---|
| *B29C 65/74* | (2006.01) |
| *B29C 65/78* | (2006.01) |
| *B29L 31/00* | (2006.01) |
| *E06B 3/96* | (2006.01) |

(52) U.S. Cl.
CPC ...... *B29C 65/7841* (2013.01); *B29C 66/1162* (2013.01); *B29C 66/5243* (2013.01); *B29C 66/52431* (2013.01); *B29C 66/72523* (2013.01); *B29C 66/73921* (2013.01); *E06B 3/9608* (2013.01); *E06B 3/9628* (2013.01); *B29L 2031/005* (2013.01)

(58) Field of Classification Search
CPC .......... B29C 66/5243; B29C 66/52431; B29C 66/72523; B29C 66/73921; B29C 66/71; B29C 65/2092; E06B 3/9608; E06B 3/9628; E06B 3/9604; B29L 2031/005
See application file for complete search history.

MACHINE FOR THE WELDING OF PLASTIC PROFILED ELEMENTS

RELATED APPLICATIONS

This application is a National Phase of PCT Patent Application No. PCT/IB2022/054030 having International filing date of May 2, 2022, which claims the benefit of priority of Italy Patent Application No. 102021000011810 filed on May 7, 2021. The contents of the above applications are all incorporated by reference as if fully set forth herein in their entirety.

FIELD AND BACKGROUND OF THE INVENTION

The present invention relates to a machine for the welding of plastic profiled elements.

It is well known that there is a particular need in many sectors of industrial activity to renew the manufactured articles and to search for new ones in order to distinguish them more from those of competitors.

This need is felt, in particular, in the industry involved in the manufacture of frames such as doors and windows made of plastic material, particularly PVC.

Such windows and doors consist of a series of plastic profiled elements, usually formed by extrusion or similar techniques, that are welded together by means of heating plates.

The heating plates obtain the melting of respective areas to be welded of the profiled elements in order to make a frame structure, inside which a pane of glass or a central panel can be placed.

Known manufacturing processes for the welding of PVC profiled elements require that the areas to be welded be properly cut at 45° to allow for perfect overlapping of the internal array of the profiled element and consequently effective welding capable of holding the profiled elements firmly joined together.

Compared with the windows and doors made of materials such as wood and aluminum, those made of plastic, although simpler to manufacture and better performing, are commonly thought to be aesthetically of inferior quality.

Within the plastic window and door industry, therefore, there is a particularly strong need to improve the aesthetic appearance of the profiled elements in order to obtain original products with novel shapes that have innovative features aimed at elevating the aesthetic perception of the product and being more attractive to customers.

In this regard, PVC windows and doors are sometimes made with colors and finishes that simulate the effect of wood.

The effect of wood can be achieved by means of a flexible plastic or wood veneer sheet, which is about 0.1 mm thick, is colored to reproduce the effect of wood, and is applied to the main faces of the PVC profiled elements, i.e., the surfaces intended to remain visible after the installation of the window/door.

Alternatively, it is possible to achieve the effect of wood by means of so-called "canopies", made of natural wood or wood-effect painted aluminum.

Canopies are half-shells that are applied, by gluing, screwing or interlocking, to the profiled elements so as to cover the main faces and partly embrace the side surfaces thereof.

However, the aesthetic effect achieved by these manufacturing methods is different from that of natural wood.

This is due to the differences in construction techniques between natural wood and plastic windows and doors and in the inherent characteristics of the two materials.

In particular, natural wood windows and doors are usually made by joining the longitudinal frame members thereof, wherein a butt portion of one frame member is interlocked to a rib portion of an adjacent frame member, thus creating a square joint, rather than a 45-degree joint.

It should be specified that the butt portions consist of end portions at the end of a frame member, while the rib portions consist of side portions of a frame member. The PVC profiled elements, on the other hand, are assembled by melting butt portions, thus creating a visibly different quarter-sawn joint than the square joint of natural wood windows and doors.

The PVC profiled elements, even when covered by plastic sheets or canopies, thus inevitably reveal the fact that they are not made of natural wood.

To remedy at least part of these drawbacks, the profiled elements can be suitably shaped in at least one of the relevant visible faces so as to achieve a square joint once the profiled elements are joined together.

Specifically, each profiled element comprises at least one main square-shaped face, that is, cut at 90°.

Specifically, the main face of a first profiled element is projecting from the relevant area to be welded and the main face of a second profiled element is recessed with respect to the relevant area to be welded.

The areas to be welded are then melted and the profiled elements coupled together, so that when the window/door is assembled, the resulting welding area has an oblique quarter-sawn joint, while at least one of the main faces has a square joint, thus giving an aesthetic effect similar to that of natural wood windows and doors.

The machines of known type for the welding of plastic profiled elements comprise:

retaining means adapted to retain the profiled elements with the areas to be welded facing each other;

removal means adapted to remove part of the plastic material from the areas to be welded;

heating means adapted to heat the areas to be welded until the plastic material is at least partly melted; and displacement means of the retaining means adapted to displace the profiled elements between a mutual away position and a mutual approaching position, wherein the heated areas to be welded are joined together.

Specifically, the removal means comprise at least one milling tool movable along the peripheral edge of the areas to be welded to make a groove, through which the length of the faces of the profiled elements is reduced so that, as a result of the welding of the same, the welding bead extends inward into the profiled elements and, therefore, is not visible from the outside.

In fact, during the joining of the profiled elements, a portion of the molten plastic material is compressed and may project with respect to the faces of the profiled elements themselves.

The machine also comprises suction means associated with the removal means and adapted to remove the residues of plastic material generated during the removal.

The suction means comprise a suction port with a substantially circular cross-section, arranged around the milling tool, in order to carry out effective removal of the removed plastic chips.

The machines of known types are susceptible to further refinement.

In fact, during machining operations, the removal means and the suction means need to be placed in contact with the areas to be welded and to be moved extremely precisely along the edge of the same, so that the milling tool can make the groove while the suction port follows the movement of the tool.

However, the projecting part of the main face of the first profiled element may hinder the movement and positioning of some machine components, especially including the removal means and the suction means.

In addition, such a conformation of the first profiled element means that the profiled elements must be kept at a greater distance from each other, thus making machining operations even more complex.

SUMMARY OF THE INVENTION

The main aim of the present invention is to devise a machine for the welding of plastic profiled elements which allows even profiled elements provided with a main face projecting from the area to be welded to be machined effectively.

Another object of the present invention is to devise a machine for the welding of plastic profiled elements which allows effective suction of plastic material residues and at the same time precise movement of the milling tool to the peripheral edge of the area to be welded.

Another object of the present invention is to devise a machine for the welding of plastic profiled elements which can overcome the aforementioned drawbacks of the prior art within the framework of a simple, rational, easy and effective to use as well as affordable solution.

The aforementioned objects are achieved by this machine for the welding of plastic profiled elements having the characteristics of claim 1.

BRIEF DESCRIPTION OF THE SEVERAL VIEWS OF THE DRAWINGS

Other characteristics and advantages of the present invention will become more apparent from the description of a preferred, but not exclusive, embodiment of a machine for the welding of plastic profiled elements, illustrated by way of an indicative, yet non-limiting example, in the attached tables of drawings wherein.

DESCRIPTION OF SPECIFIC EMBODIMENTS OF THE INVENTION

Figure 1:
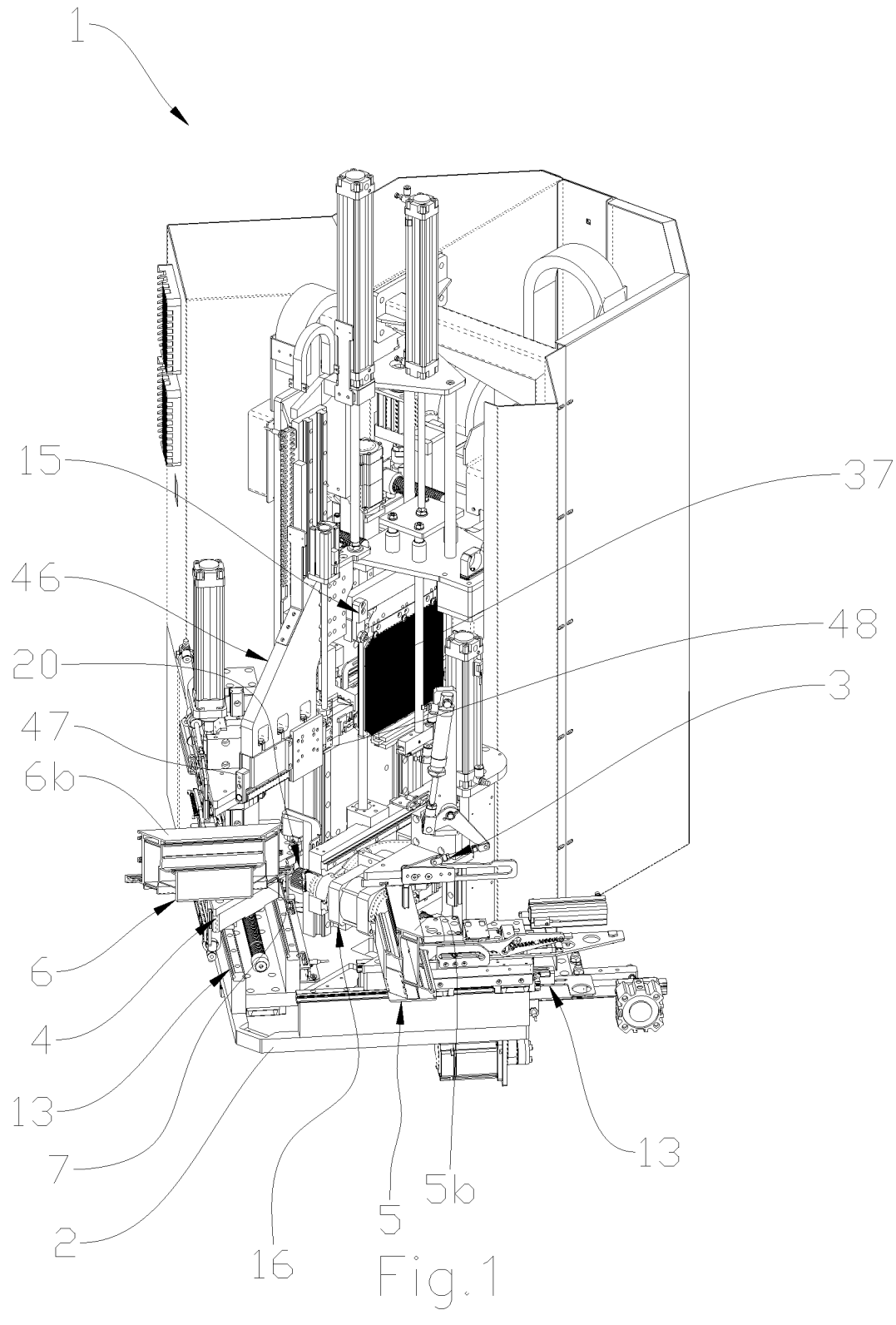
FIG. 1 is an axonometric view of the machine according to the invention.

With particular reference to these figures, reference numeral 1 globally indicates a machine for the welding of plastic profiled elements.

The machine 1 can be used in the welding of plastic profiled elements, preferably PVC, to make a window/door.

It cannot however be ruled out that the profiled elements are made of a heat-sealable plastic material other than PVC and/or of a plastic material loaded with a reinforcing material, e.g., in the form of fibers such as glass fibers or the like. Likewise, construction solutions cannot be ruled out wherein the profiled elements are made partly of a plastic material and partly of a different material, in a manner similar to some known types of profiled elements which, e.g., are provided with a canopy, an outer covering or an inner core made of metal, wood or the like.

The machine 1 comprises at least one base frame 2 and retaining means 3, 4 of a first profiled element 5 and of a second profiled element 6.

The profiled elements 5, 6 extend along respective longitudinal directions and are each provided with at least one area to be welded 7.

In the context of the present disclosure, the expression "area to be welded" means a surface of the profiled element, transverse to the relevant longitudinal direction, through which the profiled element itself is joined by welding to another profiled element, according to a method which will be described in more detail later in the present disclosure.

The area to be welded 7 is substantially inclined by an angle comprised between 10° and 80° with respect to the respective longitudinal direction.

According to the preferred embodiment shown in the figures, the area to be welded 7 is inclined by 45° with respect to the respective longitudinal direction.

Each of the profiled elements 5, 6 also comprises at least one main face 5a, 6a substantially parallel to the longitudinal direction.

In the context of this disclosure, the term "main face" means a substantially flat surface of the profiled element, intended to lie substantially parallel to the lying plane of the window/door manufactured from the profiled elements themselves and to remain visible after the window/door has been assembled. In actual facts, when the window frame is assembled on a wall or partition, the main faces are the surfaces of the profiled elements facing either the inner side or the outer side of the wall or partition.

The main face 5a, 6a is square-shaped.

Basically, the main face 5a, 6a has an extreme edge substantially orthogonal to the longitudinal direction.

Each of the profiled elements 5, 6 also comprises a secondary face 5b, 6b opposite the main face 5a, 6a.

Similarly to what has been stated with regard to the main face 5a, 6a, the expression "secondary face" also means a substantially flat surface of the profiled element, intended to lie substantially parallel to the lying plane of the window/door manufactured with the profiled elements themselves and to remain visible after the frame has been assembled. The secondary faces 5b, 6b are the surfaces of the profiled elements, opposite the main faces 5a, 6a, facing either the inner side or the outer side of the wall or partition.

The secondary face 5b, 6b is quarter-sawn shaped, that is, it is cut at 45° with respect to the longitudinal direction and is contiguous with the area to be welded 7.

The main face 5a of the first profiled element 5 is projecting with respect to the relevant area to be welded 7.

In more detail, the area to be welded 7 of the first profiled element 5 is obtained by material removal from the inner array and from the secondary face 5b, 6b of a profiled element cut at 90° with respect to the longitudinal direction. Through this process, therefore, the first profiled element 5 has the main face 5a projecting from the area to be welded 7.

The main face 6a of the second profiled element 6, on the other hand, is recessed with respect to the relevant area to be welded 7.

In more detail, the area to be welded 7 of the second profiled element 6 is obtained by cutting a profiled element by an angle of 45° with respect to the longitudinal direction, which undergoes further machining at the point where the main face 6a is located, in order to shape it to a square.

Specifically, machining is done in such a way as to remove at least part of the plastic material of the main face 6a, e.g., by means of a material removal operation, such as milling or cutting.

At the end of the machining of the second profiled element 6, a coupling face 8 is defined at the point where the machined area is located, which is lowered with respect to the main face 6a.

Figure 2:
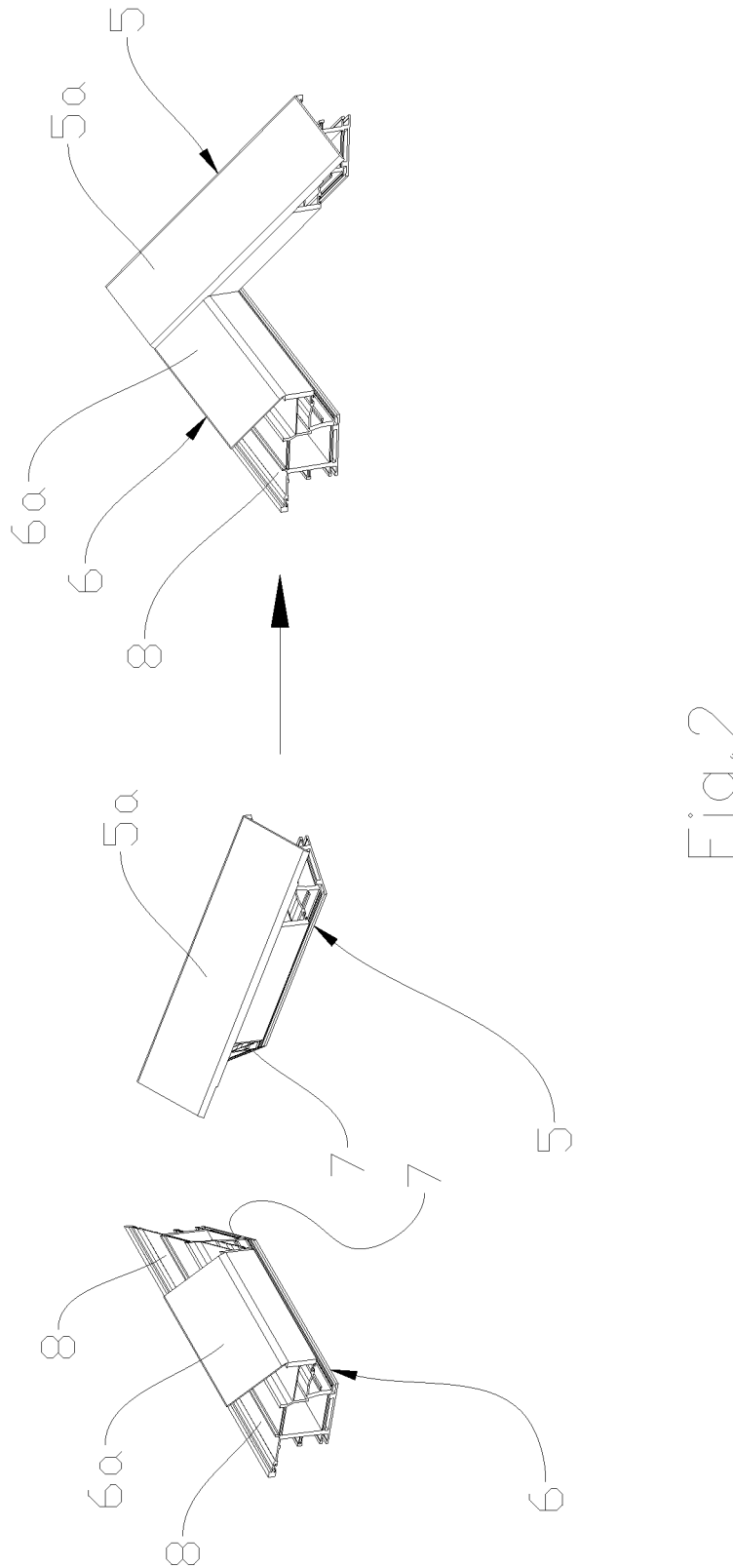
FIG. 2 is a schematic representation of the plastic profiled elements which can be machined by this machine, before and after welding.

As shown in FIG. 2, as a result of the joining of the two profiled elements 5, 6, the main face 5a of the first profiled element 5 approaches the main face 6a of the second profiled element 6 and covers the coupling face 8, thus obtaining a square joint. It should be specified that FIG. 2 shows the profiled elements 5, 6 upside down with respect to their actual arrangement on the machine 1 to better illustrate the phase of joining the main faces 5a, 6a.

Figure 12:
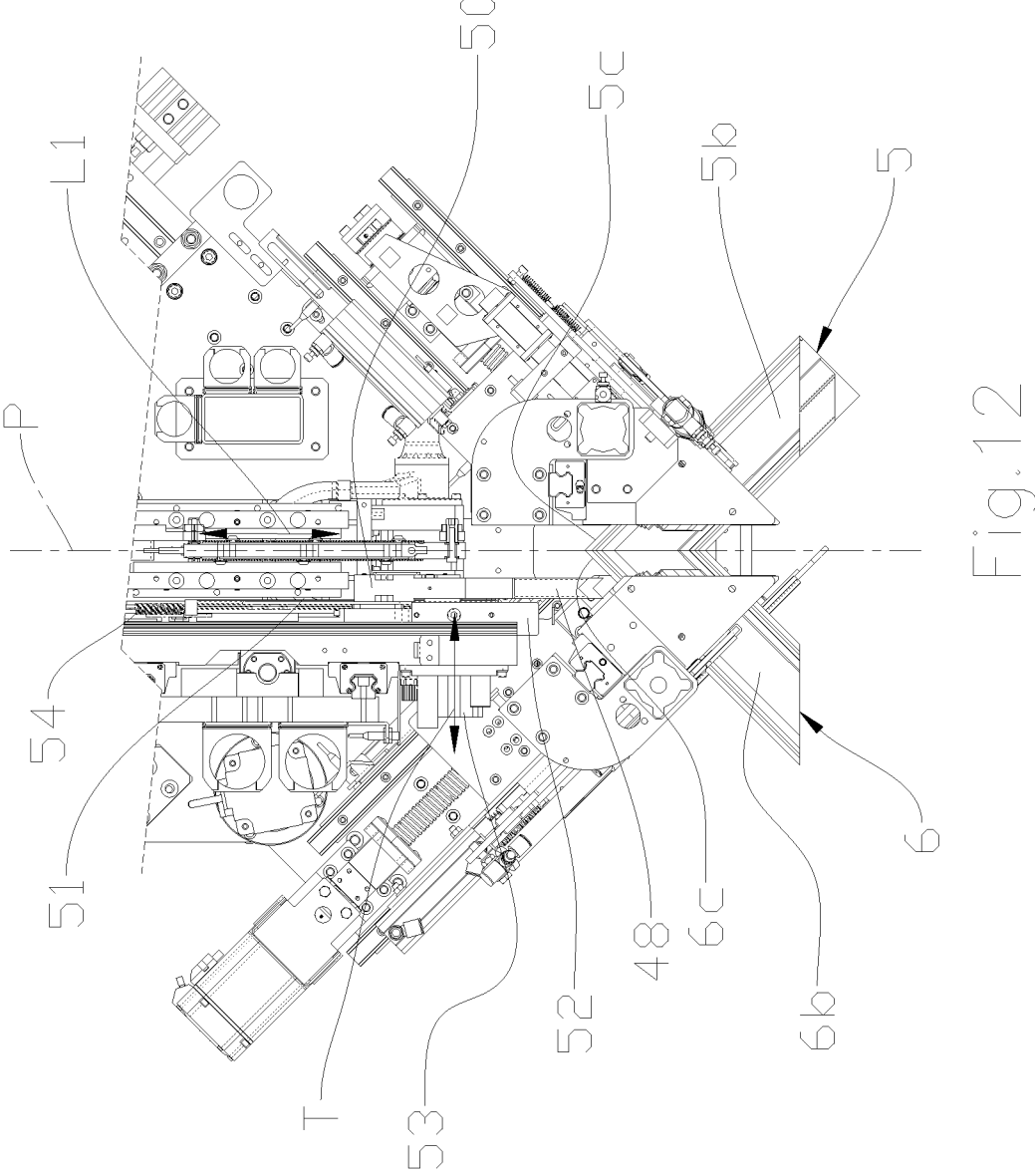

The inner arrays and the secondary faces 5b, 6b, on the other hand, are joined by means of a quarter-sawn joint (FIG. 12).

The retaining means 3, 4 are associated with the base frame 2 and are adapted to retain the profiled elements 5, 6 with the areas to be welded 7 facing each other.

The retaining means 3, 4 comprise first retaining means 3 of the first profiled element 5 and second retaining means 4 of the second profiled element 6.

Each of the retaining means 3, 4 comprises at least one resting plane 9 of the relevant profiled element 5, 6 that is substantially horizontal, and at least one clamping assembly 10 adapted to keep the profiled element 5, 6 secured to the relevant resting plane 9.

The clamping assembly 10 is of the type of a vice vertically operated by a piston cylinder, and is adapted to press the profiled element 5, 6 onto the resting plane 9.

Figure 3:
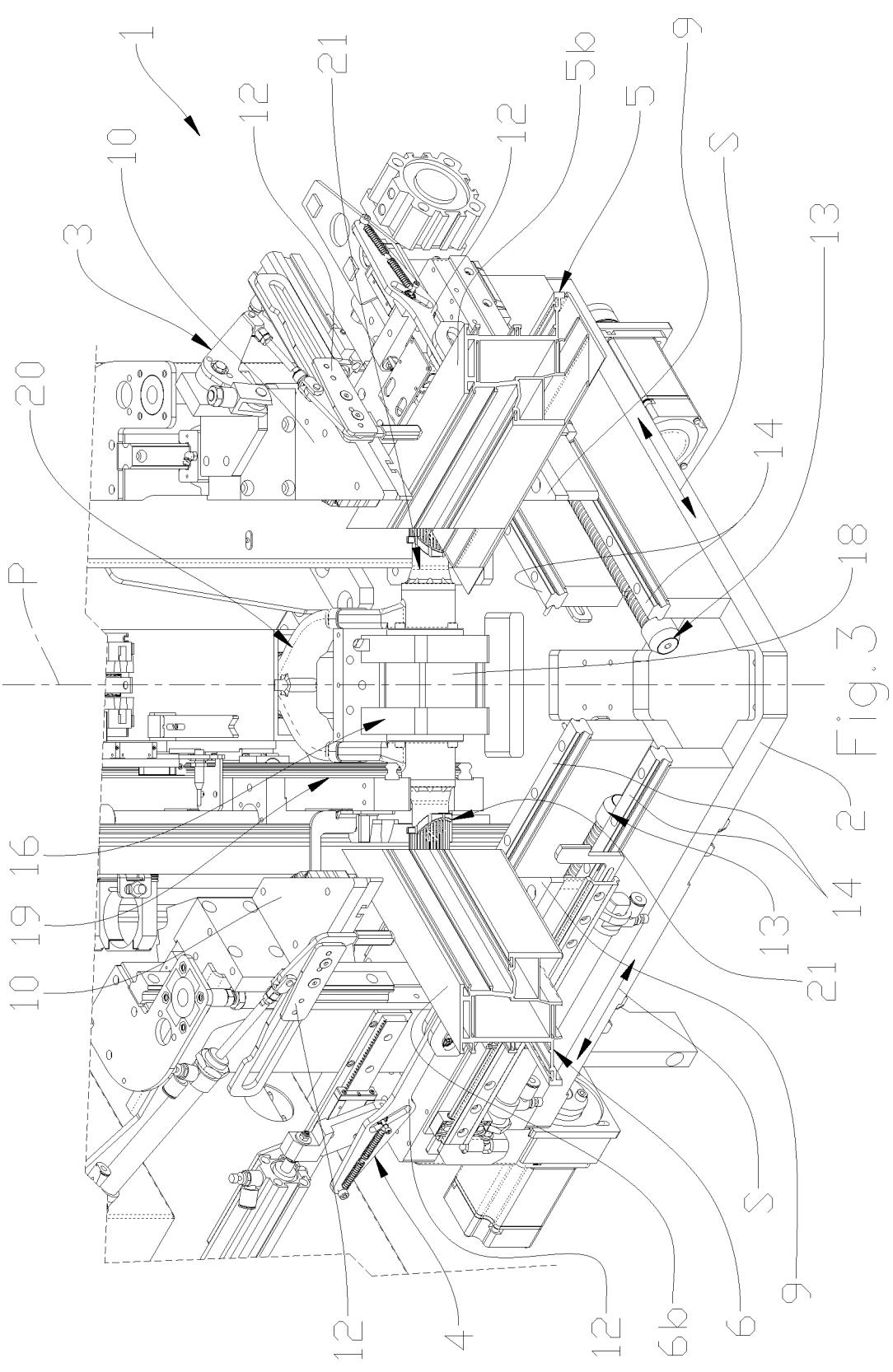
FIG. 3 is a detailed axonometric view of the retaining means and of the displacement means according to the invention.

In more detail, as shown in FIG. 3, the profiled elements 5, 6 are arranged on the relevant retaining means 3, 4 with the relevant main face 5a, 6a in contact with the resting plane 9.

The secondary faces 5b, 6b, on the other hand, face upwards.

It cannot, however, be ruled out that the retaining means 3, 4 be of a different type and that the profiled elements 5, 6 be arranged differently.

Each of the retaining means 3, 4 also comprises at least one rear abutment plane 11 of the relevant profiled element 5, 6 that is substantially vertical, and a retaining assembly 12 adapted to keep the profiled element 5, 6 in contact with the relevant abutment plane 11.

The retaining assembly 12 comprises one or more hooks and is movable to intercept the profiled element 5, 6 and pull it towards the abutment plane 11.

It cannot, however, be ruled out that the retaining means 3, 4 be of a different type.

The machine 1 is then provided with displacement means 13 of the retaining means 3, 4 adapted to displace the profiled elements 5, 6 between a mutual away position and a mutual close position.

The retaining means 3, 4 are, in fact, associated with the displacement means 13. The displacement means 13 are adapted to move the profiled elements 5, 6 to bring them to further components of the machine 1 and to join them together for the purpose of welding.

The displacement means 13 enable precise and accurate movement of both profiled elements 5, 6 along relevant directions of displacement S.

The directions of displacement S are substantially horizontal and perpendicular to each other.

In more detail, the displacement means 13 are adapted to move the profiled elements 5, 6 symmetrically with respect to a reference plane P.

The reference plane P is inclined by an angle substantially equal to 45° with respect to the directions of displacement S.

The displacement means 13 comprise guidance means 14 associated with the base frame 2, extending along the relevant directions of displacement S and supporting the retaining means 3, 4 by sliding.

The displacement means 13 also comprise actuator means which are adapted to move the retaining means 3, 4 along the relevant directions of displacement S.

The actuator means are of a type known to the engineer in the field and will not be described in detail in this disclosure.

The actuator means are adapted to move the retaining means 3, 4 independently of each other.

The machine 1 is also provided with heating means 15 associated with the base frame 2 and adapted to heat the areas to be welded 7.

More specifically, the heating means 15 are adapted to heat the areas to be welded 7 until the plastic material is at least partly melted.

The profiled elements 5, 6 are then brought, by means of the displacement means 13, to the position of mutual approach, wherein the heated areas to be welded 7 are joined together and wherein the main faces 5a, 6a form a square joint.

The heating means 15 will be described in more detail later in this disclosure.

The machine 1 also comprises removal means 16 associated with the base frame 2 and adapted to remove part of the plastic material from the areas to be welded 7.

In particular, the removal means 16 are adapted to make a groove on a peripheral edge of the areas to be welded 7 at least at the point where the secondary faces 5b, 6b are located.

In more detail, the removal means 16 are adapted to make a groove also at the point where the side faces of the profiled elements 5, 6 are located.

In the context of this disclosure, the term "side faces" refers to the surfaces of the profiled elements intended to lie substantially perpendicular to the lying plane of the window/door manufactured with the profiled elements themselves. Basically, in the case of doors or windows, the inner side faces of the profiled elements are intended to intercept a central panel (e.g., a pane of glass) of the window/door, and the outer side faces are intended to define the outer side perimeter of the window/door and abut a frame of the window/door attached to the wall or partition. In the case, on the other hand, of the window/door frame, the inner side faces of the profiled elements are intended to abut against the door or window (when closed) while the outer peripheral faces are intended to face the wall or partition to which the frame is attached.

The function of the groove is to reduce, in part, the length of the secondary faces 5*b*, 6*b* and of the side faces so that, as a result of the welding of the profiled elements 5, 6, the welding bead extends inward into the profiled elements themselves and, therefore, is not visible from the outside.

For the purpose of this disclosure, the term "welding bead" means the portion of excess molten plastic material that is generated during the joining of the profiled elements and may be projecting from the faces of the profiled elements themselves. The welding bead, therefore, affects the entire peripheral edge of the areas to be welded 7.

Thanks to the groove, after the profiled elements 5, 6 have been welded, the relevant secondary faces 5*b*, 6*b* and the outer side faces 5*c*, 6*c* are perfectly juxtaposed to each other.

The removal means 16 have, in addition, the function of removing a thin layer of plastic material sufficient to level and equalize the areas to be welded 7.

In other words, the removal means 16 are not just for shaping the grooves but can be absolutely essential for equalizing and correcting any cutting errors.

Without such leveling, the areas to be welded 7 would be too irregular and, therefore, not weldable.

It is also pointed out that the grooves and leveling of the areas to be welded 7 are made by the removal means 16 when the profiled elements 5, 6 are already mounted on the relevant retaining means 3, 4; the areas to be welded 7 are coupled and joined together without disassembling the profiled elements 5, 6 from the retaining means 3, 4.

In other words, the tooling of the profiled elements 5, 6 on the retaining means 3, 4 is done only once, and the machine 1 is able to perform all the steps involved in machining without the need for the profiled elements 5, 6 to be set up and/or machined on other machines.

This peculiar feature, in addition to ensuring remarkable speed of execution, makes it possible to avoid welding errors due to the incorrect assembly of the profiled elements 5, 6 on the retaining means 3, 4.

In fact, if the groove and/or leveling were performed on a different machine and the profiled elements 5, 6 were mounted on the machine 1 at a later time to be welded, there would be a risk of positioning the areas to be welded 7 not perfectly facing and parallel and compromising the welding of the profiled elements themselves.

The removal means 16 comprise a pair of milling tools 17 arranged facing the respective areas to be welded 7 and movable in rotation around a relevant axis of rotation R.

The axis of rotation R is substantially horizontal and perpendicular to the reference plane P.

In other words, the axis of rotation R is substantially inclined by 45° with respect to the longitudinal directions of the first profiled element 5 and of the second profiled element 6 and substantially perpendicular to the areas to be welded 7.

In particular, the milling tools 17 are positioned so that the grooves on both profiled elements 5, 6 can be made simultaneously.

However, it is worth noting that the displacement means 13 can move the retaining means 3, 4 and consequently the profiled elements 5, 6 so that, depending on production requirements, the removal means 16 make the groove on only one of the profiled elements 5, 6.

The removal means 16 comprise at least one tool assembly 18 supporting both milling tools 17 in rotation.

In more detail, the tool assembly 18 comprises an electric motor and a drive shaft associated with the motor itself, at the ends of which the milling tools 17 are arranged.

The electric motor is adapted to set the milling tools 17 in rotation around the axis of rotation.

The milling tools 17 are arranged on opposite sides of the tool assembly 18 with respect to the reference plane P.

During removal, the tool assembly 18 is positioned between the areas to be welded 7.

The machine 1 also comprises a positioning system 19 of the removal means 16 adapted to arrange the milling tools 17 at the point where the areas to be welded 7 are located and to move them on the latter to remove the plastic material.

In more detail, the positioning system 19 is adapted to move the tool assembly 18 in the reference plane P in a manner that will be described in more detail below.

The machine 1 also comprises suction means 20 associated with the removal means 16 and adapted to remove the residues of plastic material generated during the removal of the plastic material.

According to the invention, the suction means 20 comprise at least one suction duct 21 that is arranged around a respective milling tool 17 and is elongated along the relevant axis of rotation R.

Conveniently, the suction duct 21 is mounted on the tool assembly 18.

It should be specified that the presence of the main face 5*a* of the first profiled element 5, which projects from the area to be welded 7, means that the profiled elements 5, 6 must be kept at a high distance from each other to prevent the projecting part from hindering the movement of the various components of the machine 1 during machining.

Therefore, the elongated conformation of the suction duct 21 allows the suction means 20 to easily reach the areas to be welded 7 and enable effective suction of the residues made of plastic material, while preventing the tool assembly 18 from being impeded by the main face 5*a* of the first profiled element 5 in the relevant movement.

For this reason, the drive shaft of the milling tools 17 is also longer than the known solutions in order to be able to reach every point of the areas to be welded 7.

In the embodiment shown in the illustrations, the suction duct 21 according to the invention is mounted around each of the milling tools 17.

It cannot, however, be ruled out that the suction duct 21 is mounted only around the milling tool 17 intended to machine the first profiled element 5.

The suction duct 21 defines a transit opening 22 of the residues, facing the areas to be welded 7.

The milling tool 17 is arranged so that it partly projects from the transit opening 22 so that it can contact the areas to be welded 7 and at the same time allow effective suction of the residues.

Through the suction duct 21, the residues made of plastic material are conveyed to a recovery container.

For this purpose, moreover, the milling tool 17 is of helical conformation so as to convey the suctioned chips into the suction duct 21 through the transit opening 22 and facilitate the moving away thereof.

In addition, the suction means 20 comprise a series of brush elements 23 arranged around the transit opening 22.

In more detail, each of the brush elements 23 comprises a plurality of bristles extending away from the transit opening 22 and arranged substantially parallel to the relevant axis of rotation R.

During the removal, the brush elements 23 contact the area to be welded 7 and allow for the effective removal of the residues made from plastic material from the area, thus promoting the suction thereof.

In addition, the brush elements 23 form an extension of the suction duct 21 and allow making suction extremely effective and accurate.

Figures 4, 5, 6:
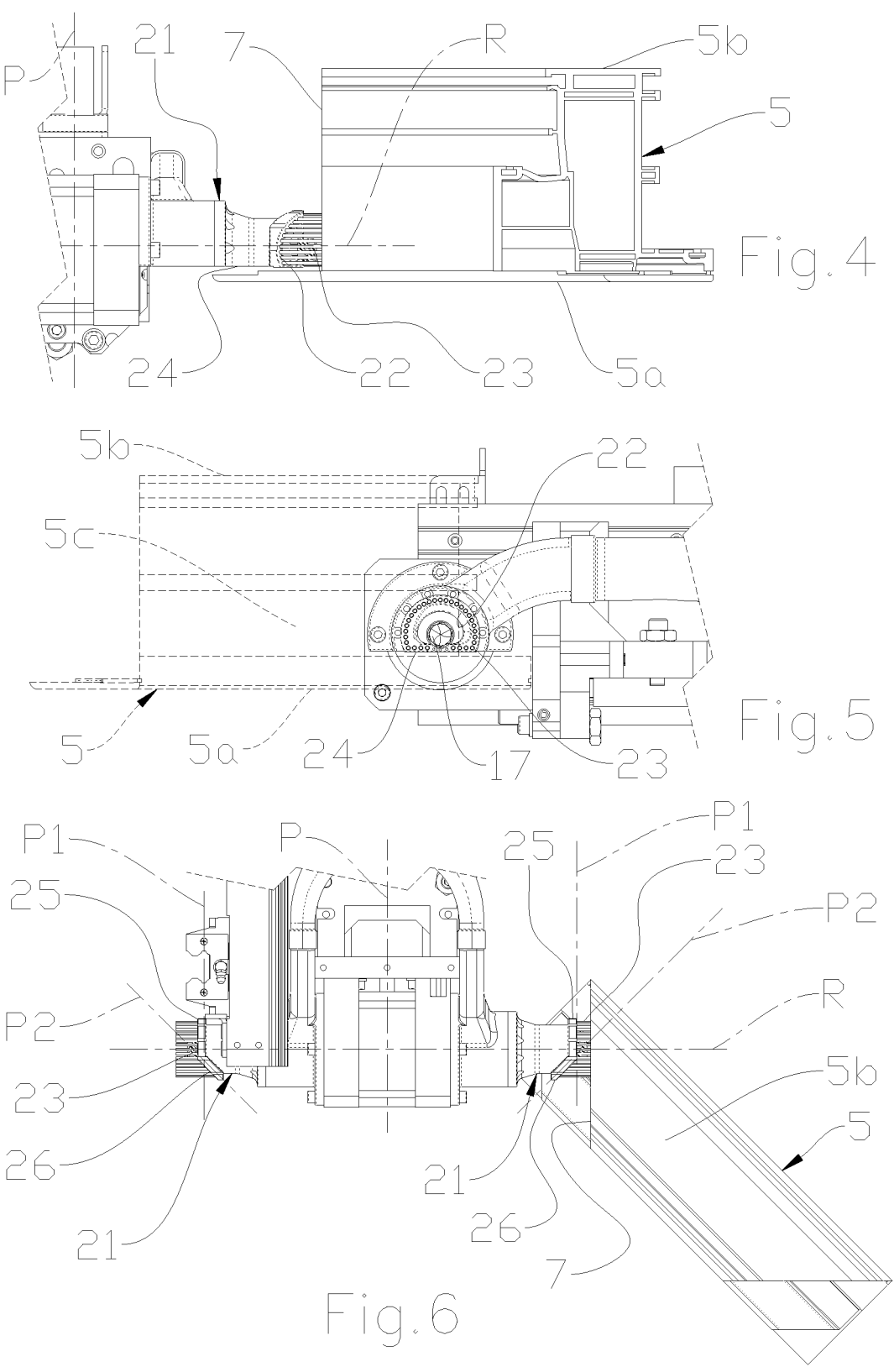
FIG. 4 is a front detailed view of the removal means and of the suction means according to the invention.
FIG. 5 is a side detailed view of the removal means and of the suction means according to the invention.
FIG. 6 is a top detailed view of the removal means and of the suction means according to the invention.

According to the invention, the suction duct 21 comprises a substantially flat abutment portion 24 adapted to internally abut against the main face 5a of the first profiled element 5 during the removal of the plastic material (FIG. 4).

The abutment portion 24 allows the suction duct 21 and, consequently, the milling tool 17 to reach every point of the area to be welded 7 without the inner part of the main face 5a hindering the movement thereof.

The inner part of the main face 5a may, in fact, have raised ribs which could hinder the movement of the suction duct 21, especially at the point where the parts of the area to be welded 7 closest to the main face 5a are located.

The abutment portion 24 is conveniently defined at the point where the transit opening 22 is located.

The abutment portion 24 lies on a substantially horizontal plane.

Advantageously, the abutment portion 24 is arranged below the milling tool 17 (FIG. 5).

As shown above, in fact, the profiled elements 5, 6 are arranged with the main faces 5a, 6a in contact with the relevant resting planes 9. During removal, therefore, the main face 5a is arranged below the milling tool 17.

It cannot, however, be ruled out that, by varying the type of retaining means 3, 4 and the arrangement of the profiled elements 5, 6 with respect thereto, the abutment portion 24 may be arranged differently with respect to the milling tool 17.

In the embodiment shown in the figures, the suction duct 21 is made of a rigid material and the abutment portion 24 is fixed.

In accordance with an alternative embodiment not shown in the figures, the suction duct 21 is made of a deformable material and the abutment portion 24 is obtainable by deformation of the suction duct itself.

In more detail, the suction duct 21 can take on different conformations depending on production requirements, e.g., it may have a substantially circular cross section and its shape can be modified by an operator to obtain the abutment portion 24 substantially flat.

The deformation of the suction duct 21 may be performed manually or through the use of actuators.

Advantageously, as shown in FIG. 6, the transit opening 22 comprises:

a first section 25 lying on a first plane P1 substantially vertical and perpendicular to the axis of rotation R; and a second section 26 contiguous to the first section 25, lying on a second plane P2 substantially vertical and inclined with respect to the first plane P1.

In more detail, the first plane P1 is substantially parallel to the reference plane P and to the area to be welded 7.

The second plane P2 is inclined with respect to the first plane P1 by an angle substantially equal to 135°.

In more detail, the second plane P2 is basically perpendicular to the longitudinal direction of the relevant profiled element 5, 6 and parallel to the extreme edge of the main face 5a, 6a.

The arrangement of the second section 26 on an inclined plane allows the milling tool 17 to machine the outer side face 5c extremely accurately in order to make the groove. In particular, the milling tool 17 is also able to reach the point on the outer side face 5c closest to the main face 5a, without the latter or its ribs hindering the movement of the suction duct 21.

In the embodiment shown in the figures, the first section 25 and the second section 26 are mutually secured.

In accordance with an alternative embodiment, not shown in detail in the figures, the first section 25 and the second section 26 are mutually movable. The mutual position of the sections 25, 26 is, therefore, defined according to production requirements, e.g., on the basis of the actual angle of inclination of the area to be welded 7 with respect to the longitudinal direction of the profiled element 5.

The sections 25, 26 can, e.g., be hinged to each other and be moved manually or by means of actuators.

For this purpose and as previously described, the suction duct 21 is made of a deformable material so that the sections 25, 26 can be moved.

Figure 7:
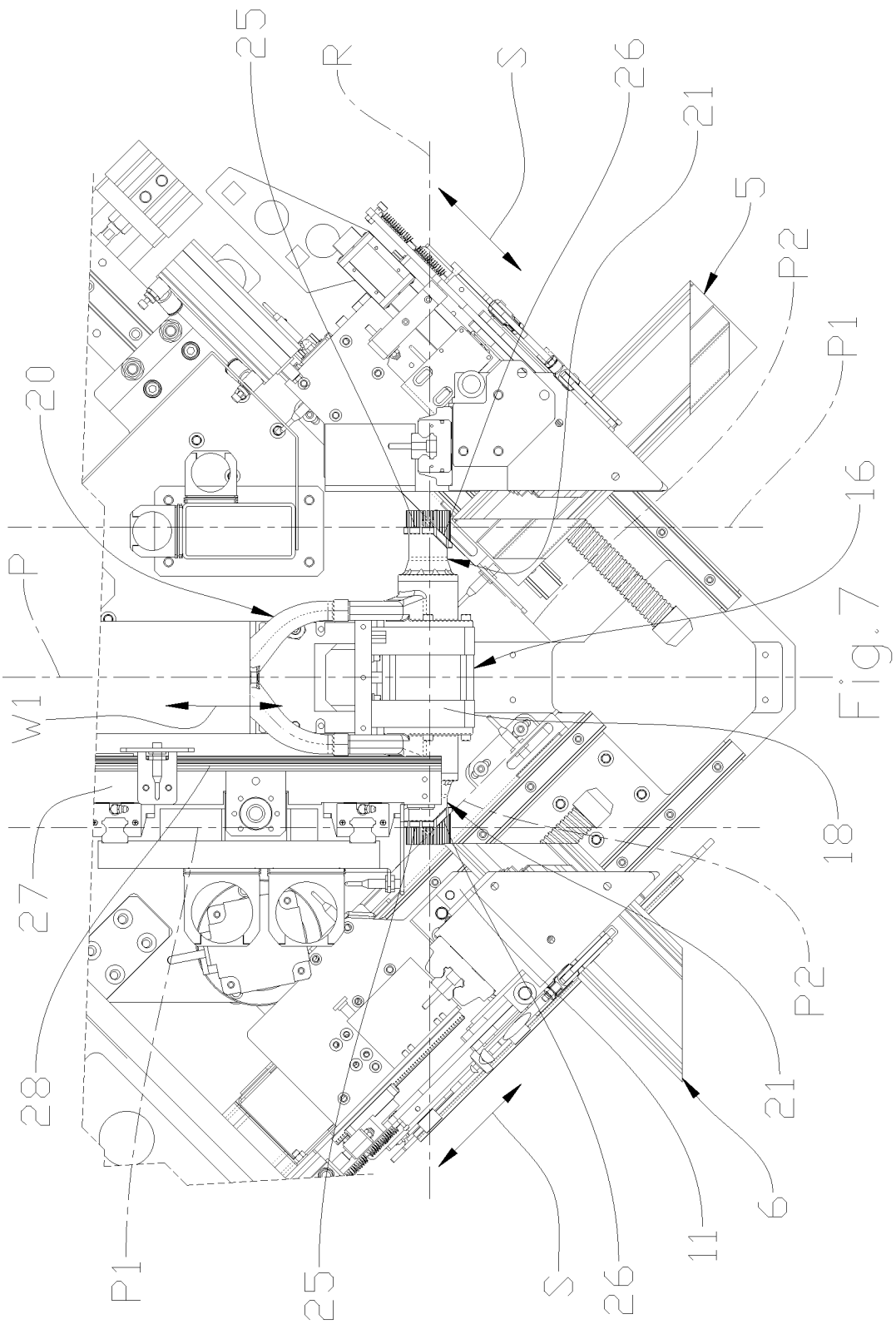
FIGS. 7 and 8 are axonometric views of the removal means, of the suction means and of the relevant positioning system according to the invention.
Figure 8:
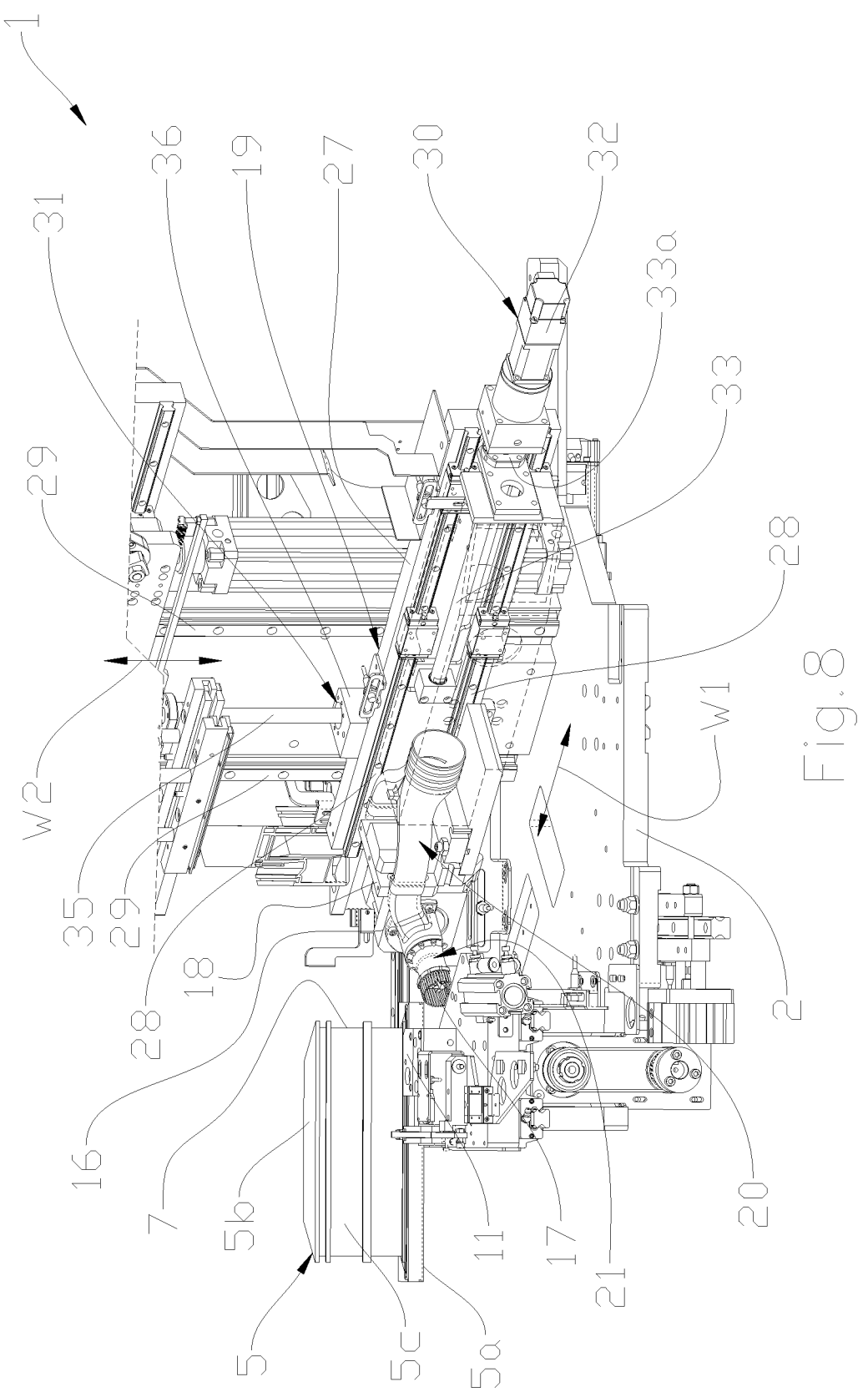

The positioning system 19 of the removal means 16 is also adapted to move the suction means 20 (FIGS. 7 and 8).

In more detail, the positioning system 19 is adapted to arrange the suction ducts 21 at the point where the areas to be welded 7 are located and to move them with respect thereto to suck up the plastic material while removing it.

The positioning system 19 comprises at least one supporting frame 27 of the removal means 16 and of the suction means 20.

The positioning system 19 also comprises:

at least one guidance assembly 28 associated with the supporting frame 27, extending along a first operating direction W1 and supporting the removal means 16 and the suction means 20 in a sliding manner; and at least one guidance unit 29 associated with the base frame 2 extending along a second operating direction W2 and supporting the supporting frame 27 in a sliding manner.

Specifically, the first operating direction W1 and the second operating direction W2 are substantially perpendicular to each other.

Conveniently, the first operating direction W1 and the second operating direction W2 are parallel to the reference plane P.

In the embodiment shown in the figures, the first operating direction W1 is substantially horizontal and the second operating direction W2 is substantially vertical.

The guidance assembly 28 supports the tool assembly 18 in a sliding manner on the supporting frame 27 along the first operating direction W1.

The supporting frame 27 is, in turn, associated with the guidance unit 29 in a sliding manner along the second operating direction W2.

The positioning system 19 is also provided with controlled-axes actuator means 30, 31 adapted to move the removal means 16 and the suction means 20 along the first operating direction W1 and along the second operating direction W2.

Specifically, as shown in detail in FIG. 8, the positioning system 19 comprises:

a first drive assembly 30 adapted to move the tool assembly 18 along the first operating direction W1; and a second drive assembly 31 adapted to move the supporting frame 27 along the second operating direction W2.

The first drive assembly 30 comprises a first motor device 32 and a first evolving screw shaft 33 extending along the first operating direction W1.

The first evolving screw shaft 33 engages a first threaded wheel 33a associated with the tool assembly 18.

The rotation of the first evolving screw shaft 33 results in the movement of the tool assembly 18 along the first operating direction W1.

Similarly, the second drive assembly 31 comprises a second motor device 34 and a second evolving screw shaft 35 extending along the second operating direction W2.

The second evolving screw shaft 35 engages a second threaded wheel 36 associated with the supporting frame 27.

The rotation of the second evolving screw shaft 35 results in the movement of the supporting frame 27 and, consequently of the tool assembly 18, along the second operating direction W2.

In this way, the milling tools 17 and the relevant suction ducts 21 can be positioned extremely precisely in the reference plane P to carry out the removal and taking off of the plastic material.

As stated above, the machine 1 comprises heating means 15.

The heating means 15 comprise a heating plate 37 adapted to heat the areas to be welded 7 until the plastic material is at least partly melted.

The heating plate 37 is of the type of an electric resistance plate, flat in shape.

The heating plate 37 is intended to contact the areas to be welded 7 to enable them to be heated.

In more detail, the heating plate 37 is movable to position itself between the areas to be welded 7 with these in the mutual away position.

The profiled elements 5, 6 are then moved by means of the displacement means 13 to bring the areas to be welded 7 into contact with the heating plate 37.

After heating is completed, the heating plate 37 is moved away and the profiled elements 5, 6 are brought to the mutual close position wherein the heated areas to be welded 7 are joined together and wherein the main faces 5a, 6a form the square joint.

At the same time, the secondary faces 5b, 6b form a quarter-sawn joint.

Once cooled down, the plastic material hardens to hold the profiled elements together.

In more detail, the inner arrays of the profiled elements 5, 6 and the secondary faces 5b, 6b melt with each other and hold the profiled elements 5, 6 together, while the main faces 5a, 6a are juxtaposed to each other. In particular, the main face 5a of the first profiled element 5 is arranged to coat the coupling face 8 of the second profiled element 6.

Figure 9:
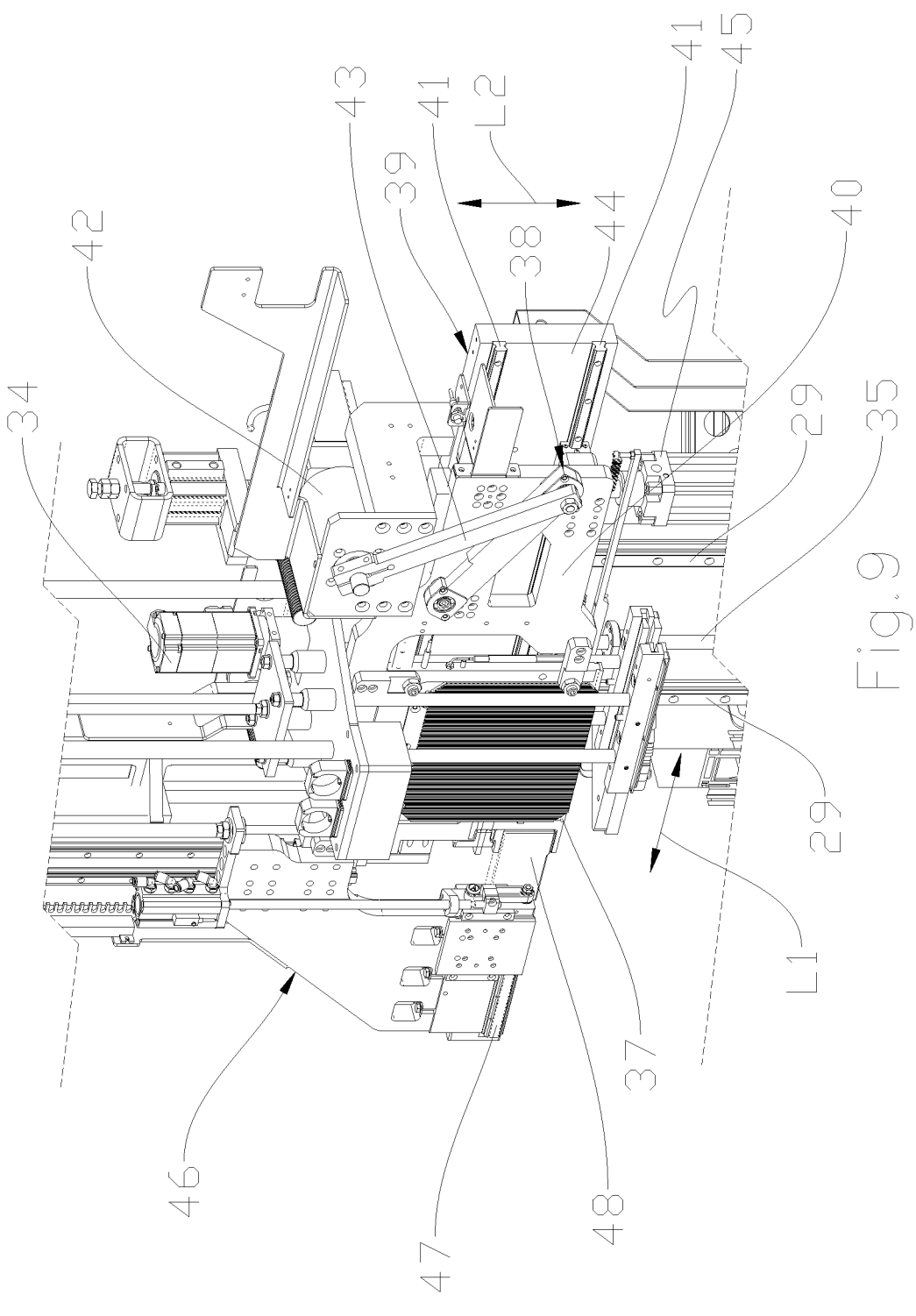
FIGS. 9 and 10 are axonometric views of the heating means and of the relevant movement system according to the invention.
Figure 10:
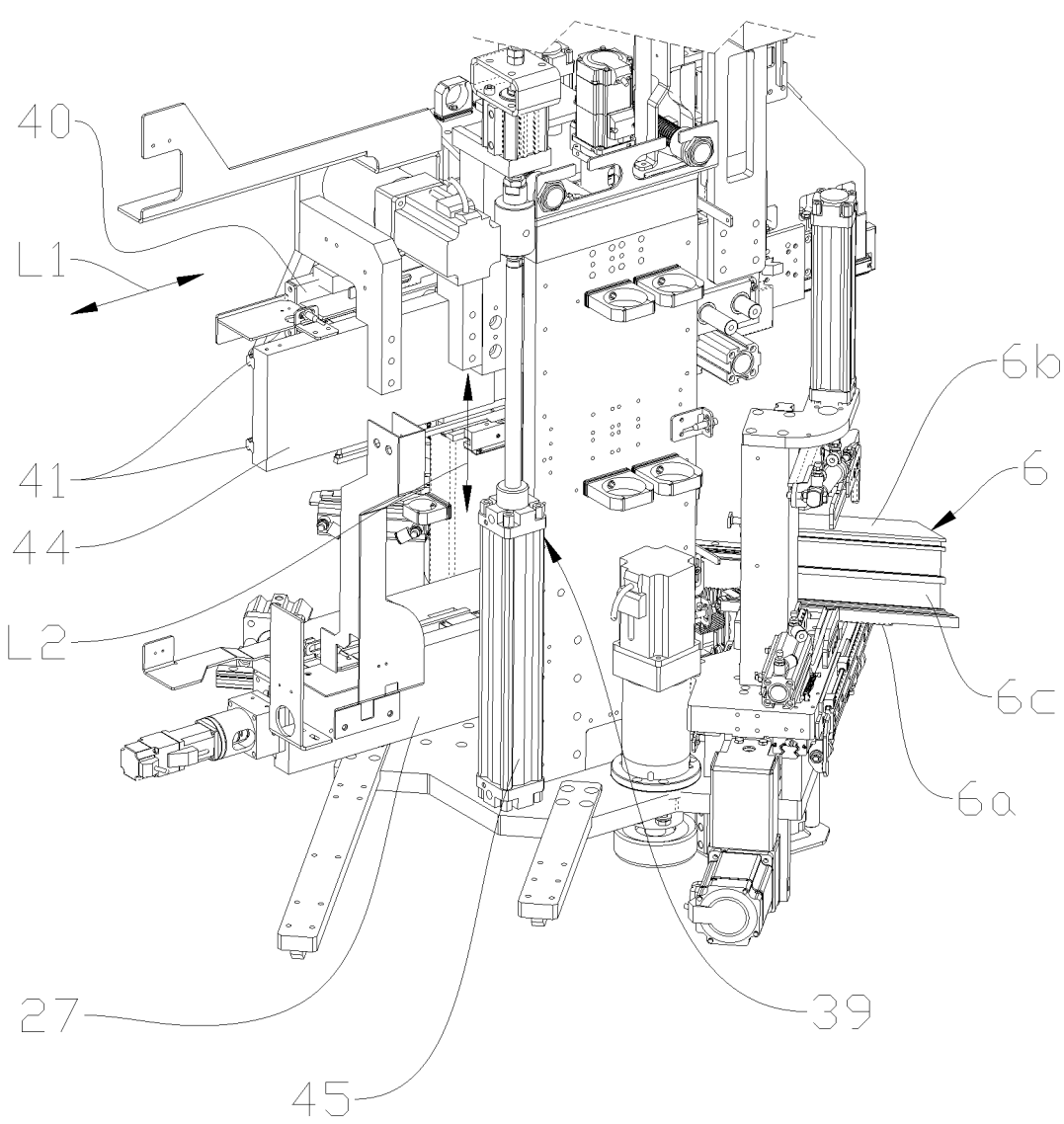

Conveniently, as shown in FIGS. 9 and 10, the heating means 15 comprise a movement system 38, 39 for moving the heating plate 37 between a home position wherein it is moved away from the areas to be welded 7 and a working position wherein it is positioned between the areas to be welded 7.

The movement system 38, 39 comprises:
   at least one movement unit 38 adapted to move the heating plate 37 along a first working direction L1; and
   at least one movement assembly 39 adapted to move the heating plate 37 along a second working direction L2.
   Specifically, the first working direction L1 and the second working direction L2 are substantially perpendicular to each other.

Conveniently, the first working direction L1 and the second working direction L2 are parallel to the reference plane P.

In the embodiment shown in the figures, the first working direction L1 is substantially horizontal and the second working direction L2 is substantially vertical.

As shown in FIG. 9, the movement unit 38 comprises:
   at least one holding frame 40 of the heating plate 37;
   at least one guidance system 41 extending along the first working direction L1 and supporting the holding frame 40 in a sliding manner; and
   at least one actuator assembly 42, 43 associated with the holding frame 40 and adapted to move the heating plate 37 along the first working direction L1.

In more detail, the movement unit 38 is adapted to move the heating plate 37 along the first working direction L1 between the working position and a backward position with respect to the profiled elements 5, 6 in order not to hinder the working area and to allow further machining operations to be carried out.

Specifically, the actuator assembly 42, 43 is of the type of a controlled-axes movement system and allows micrometric movement of the holding frame 40.

In the embodiment shown in the figures, the actuator assembly 42, 43 comprises an actuator device 42 associated with the base frame 2 and an articulated arm 43 positioned between the actuator device 42 and the holding frame 40.

The actuator device 42 is of the type of an electric motor and is adapted to set the articulated arm 43 in rotation, the movement of which causes the holding frame 40 and, consequently, the heating plate 37 to slide along the first working direction L1.

The movement assembly 39 comprises:
   at least one holding structure 44 supporting the guidance system 41 and associated with the guidance unit 29 in a sliding manner; and
   at least one actuator unit 45 associated with the holding structure 44 and adapted to move the heating plate 37 along the second working direction L2.

In actual facts, the guidance unit 29 supports both the tool assembly 18 and the heating plate 37 by sliding.

It is worth noting that the special expedient of assembling the heating means 15 and the removal means 16 on the same guidance unit 29 makes it possible to keep the overall dimensions of the machine 1 considerably small and to limit the number of its components.

In a preferred embodiment, the actuator unit 45 is of the type of a fluid-operated cylinder positioned between the base frame 2 and the holding structure 44 (FIG. 10).

Advantageously, the machine 1 comprises containment means 46 adapted to abut on at least the secondary faces 5b, 6b at the point where the areas to be welded 7 are located to contain the welding bead.

More specifically, the containment means 46 are adapted to contain the welding bead projecting with respect to the secondary faces 5b, 6b and to the outer side faces 5c, 6c of the profiled elements 5, 6.

To this end, the containment means 46 comprise:
   at least one containment body 47 adapted to contain the welding bead projecting with respect to the secondary faces 5b, 6b; and
   at least one containment element 48 adapted to contain the welding bead projecting with respect to the outer side faces 5c, 6c.

Specifically, in the embodiment shown in the figures, the containment body 47 is arranged on top of the lying plane of the profiled elements 5, 6 and is movable downwards to abut on the secondary faces 5*b*, 6*b* at the point where the areas to be welded 7 are located.

In more detail, the containment body 47 is movable in the reference plane P.

The containment body 47 and the movement thereof are known to the engineer in the field and will not be described in detail in the present disclosure.

The containment element 48 is, on the other hand, adapted to abut on the outer side faces 5*c*, 6*c* of the profiled elements 5, 6 at the point where the areas to be welded 7 are located.

Specifically, the containment element 48 is V-shaped and is intended to contact the outer side faces 5*c*, 6*c* of the profiled elements 5, 6 when joined together.

The containment element 48 is movable between a containment position wherein it lies in the reference plane P and contacts the outer side faces 5*c*, 6*c* and a non-use position wherein it is moved away from the outer side faces 5*c*, 6*c* and from the reference plane P and allows the movement of the heating plate 37.

In more detail, the containment element 48 is movable along the first working direction L1, in the reference plane P, between the containment position and a use position, wherein it is set back with respect to the containment position, and along a transverse direction T, to shift with respect to the reference plane P between the use position and the non-use position.

In the embodiment shown in the figures, the transverse direction T is perpendicular to the reference plane P.

Figure 11:
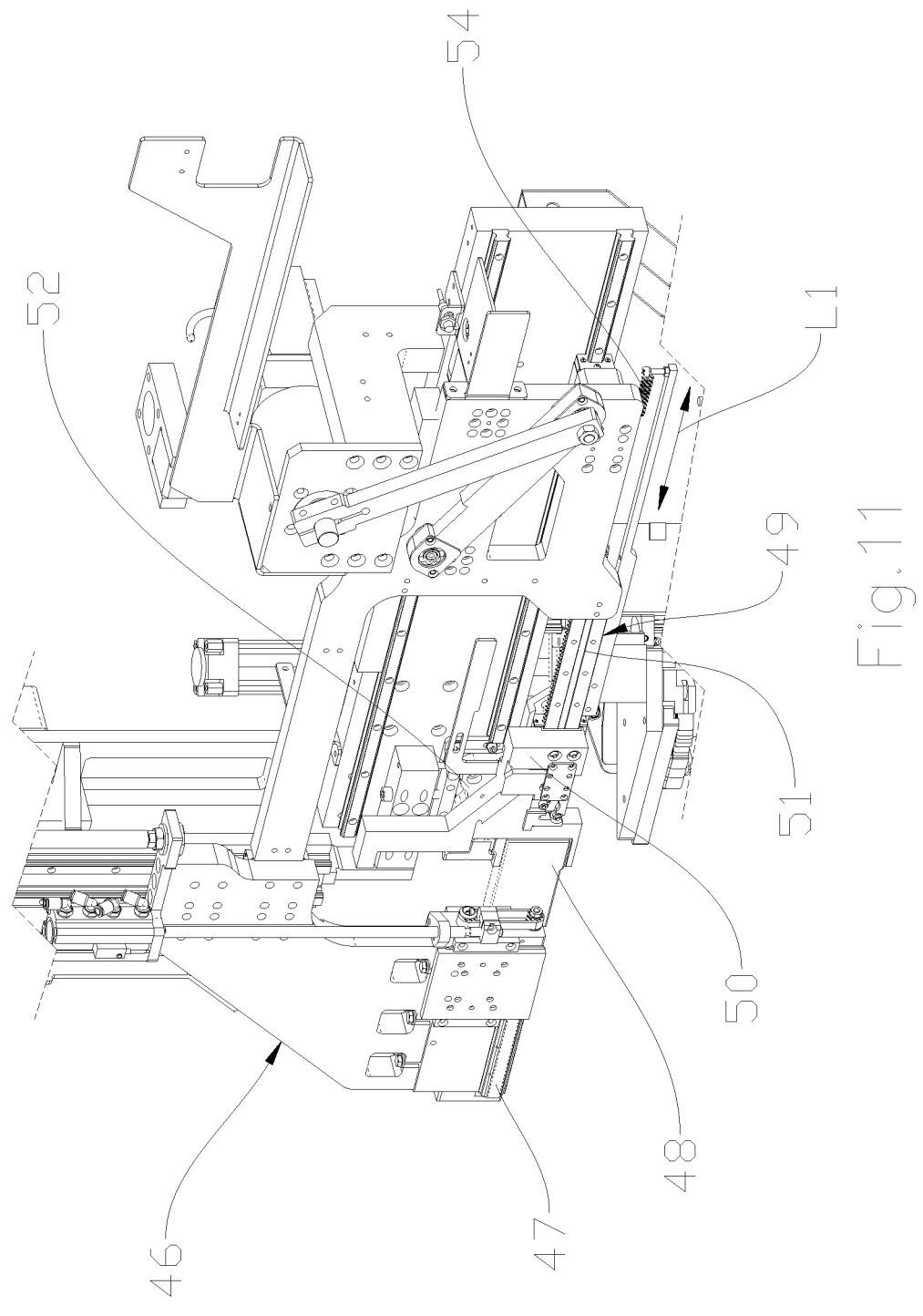
FIGS. 11 and 12 are axonometric views of the containment element and of the relevant displacement assembly according to the invention.

The machine 1 comprises at least one displacement assembly 49 adapted to move the containment element 48, shown in FIGS. 11 and 12.

As shown in FIG. 11, the displacement assembly 49 comprises:

at least one holding body 50 of the containment element 48;

at least one rail body 51 associated with the holding body 50 extending parallel to the first working direction L1;

at least one carriage 52 associated with the holding structure 44 in a movable manner and supporting the rail body 51 in a sliding manner.

The containment element 48 is, therefore, movable, from the use position to the containment position, locked together with the heating plate 37 along the second working direction L2.

The displacement assembly 49 also comprises at least one actuator 53 positioned between the holding structure 44 and the carriage 52 and adapted to move the latter along the transverse direction T (FIG. 12).

The actuator 53 is, therefore, adapted to move the containment element 48 between the non-use position and the use position along the transverse direction T.

The actuator 53 is of the linear type, such as e.g. the type of a pneumatic cylinder. It cannot, however, be ruled out that the actuator 53 may be of a different type.

Instead, the displacement of the containment element 48 from the use position to the containment position is carried out thanks to the motion of the heating plate 37 along the first working direction L1.

More specifically, the containment element 48 is brought to the use position with the heating plate 37 in the backward position. In other words, between the containment position and the use position, the containment element 48 is positioned between the heating plate 37 and the profiled elements 5, 6.

The movement unit 38 is also adapted to move the containment element 48 towards the containment position due to the thrust of the heating plate 37.

The heating plate 37 contacts the holding body 50 and pushes it along the first working direction L1.

The displacement assembly 49 also comprises an elastic element 54 adapted to bring the containment element 48 from the containment position to the use position.

The elastic element 54 is of the type of a spring and is positioned between one end of the rail body 51 and the carriage 52.

During the displacement towards the containment position, the elastic element 54 becomes elastically charged as the rail body 51 slides on the carriage 52.

At the end of the welding bead containment operations, the heating plate 37 is moved back to the backward position and the elastic element 54 moves the containment element 48 back to the use position.

It has, in practice, been ascertained that the described invention achieves the intended objects, and in particular, the fact is emphasized that the machine for the welding of plastic profiled elements according to the invention allows even profiled elements provided with a main face projecting from the area to be welded to be machined effectively.

In addition, the present machine for the welding of plastic profiled elements enables effective suction of the residues made of plastic material while precisely moving the milling tool to the peripheral edge of the area to be welded.

The invention claimed is:

1. A machine for the welding of plastic profiled elements, comprising:

at least one base frame;

retaining means of a first profiled element and of a second profiled element made of plastic material, which extend along respective longitudinal directions and are each provided with at least one area to be welded substantially inclined by an angle comprised between 10° and 80° with respect to said respective longitudinal direction and which each comprise at least one main face substantially parallel to said longitudinal direction and square-shaped, wherein the main face of the first profiled element is projected with respect to the respective area to be welded and the main face of the second profiled element is recessed with respect to the relevant area to be welded, said retaining means being associated with said base frame and being adapted to retain the profiled elements with said areas to be welded facing each other;

removal means associated with said base frame and comprising a pair of milling tools arranged facing the respective areas to be welded, movable in rotation around a relevant axis of rotation and adapted to remove part of said plastic material from said areas to be welded;

suction means associated with said removal means and adapted to remove the residues of plastic material generated during the removal of said plastic material;

heating means associated with said base frame and adapted to heat said areas to be welded;

displacement means of said retaining means adapted to displace said profiled elements between a mutual away position and a mutual approaching position, wherein said heated areas to be welded are joined together and wherein said main faces form a square joint;

wherein said suction means comprise at least one suction duct arranged around a respective milling tool and elongated along the relevant axis of rotation, which comprises a substantially flat abutment portion adapted to internally abut against said main face of the first profiled element during the removal of said plastic material.

2. The machine according to claim 1, wherein said abutment portion lies on a substantially horizontal plane.

3. The machine according to claim 1, wherein said abutment portion is arranged below said milling tool.

4. The machine according to claim 1, wherein said suction duct defines a transit opening of said residues, facing said areas to be welded, said abutment portion being defined at the point where said transit opening is located.

5. The machine according to claim 1, wherein said transit opening comprises:

a first section lying on a first plane substantially vertical and perpendicular to said axis of rotation; and a second section contiguous to said first section, lying on a second plane substantially vertical and inclined with respect to said first plane.

6. The machine according to claim 5, wherein said second plane is inclined with respect to said first plane by an angle substantially equal to 135°.

7. The machine according to claim 1, wherein the machine comprises a positioning system of said removal means and of said suction means adapted to arrange said milling tools and said suction ducts at the point where said areas to be welded are located and to move said milling tools and said suction ducts along said areas to be welded to remove and take said plastic material away.

8. The machine according to claim 7, wherein said positioning system comprises:

at least one supporting frame of said removal means and of said suction means;

at least one guidance assembly associated with said supporting frame, extending along a first operating direction and supporting said removal means and said suction means in a sliding manner;

at least one guidance unit associated with said base frame extending along a second operating direction and supporting said supporting frame in a sliding manner;

controlled-axes actuator means adapted to move said removal means and said suction means along said first operating direction and along said second operating direction.

9. The machine according to claim 1, wherein said profiled elements comprise each a secondary face opposite said main face, said removal means being further adapted to make a groove on a peripheral edge of the areas to be welded at least at the point where secondary faces are located.

10. The machine according to claim 9, wherein the machine comprises containment means adapted to abut against at least said secondary faces at the point where said areas to be welded are located to contain a welding bead.

* * * * *